US006277274B1

(12) United States Patent
Coffman

(10) Patent No.: US 6,277,274 B1
(45) Date of Patent: Aug. 21, 2001

(54) METHOD AND APPARATUS FOR TREATING STORMWATER RUNOFF

(76) Inventor: Larry Steven Coffman, 15702 Pincroft La., Bowie, MD (US) 20716

( * ) Notice: Subject to any disclaimer, the term of this patent is extended or adjusted under 35 U.S.C. 154(b) by 0 days.

(21) Appl. No.: 09/533,380

(22) Filed: Mar. 22, 2000

Related U.S. Application Data

(60) Provisional application No. 60/129,542, filed on Apr. 16, 1999.

(51) Int. Cl.$^7$ .................................................. B01D 33/70
(52) U.S. Cl. ......................... 210/150; 210/170; 210/262; 210/602; 210/903
(58) Field of Search ..................................... 210/150, 151, 210/170, 261, 262, 266, 291, 602, 903

(56) References Cited

U.S. PATENT DOCUMENTS

| 624,985 | 5/1899 | Scott-Moncrieff . |
| 681,884 | 9/1901 | Monjeau . |
| 2,222,310 | * 11/1940 | Emery .................................. 210/602 |

(List continued on next page.)

FOREIGN PATENT DOCUMENTS

| 3244787 | 6/1984 | (DE) . |
| 300015 | 5/1992 | (DE) . |
| 2182651 | 5/1987 | (GB) . |

OTHER PUBLICATIONS

"Design Manual for the Use of Bioretention in Stormwater Management", Prince George's County Government, Jun. 8, 1993.
"Optimization of Bioretention Design for Water Quality and Hydrologic Characteristics", Project No. 01–4–31032, Allen P. Davis et al. Prince George's County, Jun. 1998.
"Bioretention Monitoring, Preliminary Data Analysis", Nov. 1997, pp. 1–9.
"Bioretention and Low–Impact Development General Design Guideline Update", Department of Environmental Resources—Prince George's County, Revision 01 issued Jun. 9, 1998.
"Appropriate BMP Technologies for Ultra–Urban Applications", Warren Bell et al, Sep. 15–18, 1998, pp. 1–37.
"Stormwater BMP: Bioretention ", MTB, pp. 1–8.
"Pennsylvania Handbook of Best Management Practices for Developing Areas", Bioretention, Nov. 14, 1997, pp. 1–11.
"Bioretention: An Efficient, Cost Effective Stormwater Management Practice", Larry Coffman et al., pp. 1–18.
"Nov. 1997 Low–Impact Development Design Manual".

Primary Examiner—Christopher Upton
(74) Attorney, Agent, or Firm—Jacobson Holman, PLLC

(57) ABSTRACT

A water treatment system, method and apparatus for removing sediment, chemical pollutants and debris from contaminated stormwater runoff using physical, chemical and biological processes by passing runoff water preferably through a two-stage filtering and treatment system. The apparatus includes a first stage chamber filter system comprising a water storage area, a mulch layer, a soil mixture of aggregate, organic material, soil, and live woody and/or herbaceous plants. The second stage treatment system is a water-filled lower chamber with baffles to increase the flow path of treated runoff through the chamber. Contaminated stormwater runoff or wastewater effluent is directed to and passes through the first stage chamber by gravity where the contaminated water is filtered and treated by the mulch, soil and plant filter media under aerobic conditions. The treated water from the first stage is directed to the second stage water-filled chamber where it is further treated through physical means (sedimentation) and anaerobic biological processes and discharged to the receiving waters or drainage system. The first stage chamber can be used without the second stage chamber when conditions warrant.

28 Claims, 6 Drawing Sheets

U.S. PATENT DOCUMENTS

| | | | | |
|---|---|---|---|---|
| 2,463,464 | * | 3/1949 | Lind | 210/150 |
| 3,577,678 | | 5/1971 | Burton . | |
| 3,770,623 | * | 11/1973 | Seidel | 210/151 |
| 3,894,355 | * | 7/1975 | Carothers | 210/602 |
| 4,031,009 | | 6/1977 | Hicks . | |
| 4,415,450 | | 11/1983 | Wolverton . | |
| 4,715,958 | | 12/1987 | Fuchs . | |
| 4,839,051 | | 6/1989 | Higa . | |
| 4,855,040 | | 8/1989 | Kickuth . | |
| 4,995,969 | * | 2/1991 | LaVigne | 210/150 |
| 5,030,353 | * | 7/1991 | Stuth | 210/151 |
| 5,073,257 | | 12/1991 | Higa . | |
| 5,269,094 | | 12/1993 | Wolverton et al. . | |
| 5,273,653 | * | 12/1993 | Kickuth | 210/170 |
| 5,281,332 | | 1/1994 | Vandervelde et al. . | |
| 5,322,629 | | 6/1994 | Stewart . | |
| 5,352,357 | * | 10/1994 | Perry | 210/261 |
| 5,437,786 | | 8/1995 | Horsley et al. . | |
| 5,486,291 | | 1/1996 | Todd et al. . | |
| 5,549,817 | | 8/1996 | Horsley et al. . | |
| 5,624,576 | | 4/1997 | Lenhart et al. . | |
| 5,626,644 | | 5/1997 | Northrop . | |
| 5,632,896 | | 5/1997 | Vandervelde et al. . | |
| 5,637,218 | | 6/1997 | Kickuth . | |
| 5,695,651 | | 12/1997 | Froud . | |
| 5,702,593 | | 12/1997 | Horsley et al. . | |
| 5,707,513 | * | 1/1998 | Jonett et al. | 210/150 |
| 5,707,527 | | 1/1998 | Kavtson et al. . | |
| 5,733,453 | | 3/1998 | DeBusk . | |
| 5,744,048 | | 4/1998 | Stetler . | |
| 5,770,057 | | 6/1998 | Filion . | |
| 5,810,510 | | 9/1998 | Urriola . | |
| 6,024,870 | * | 2/2000 | Thompson | 210/291 |

* cited by examiner

METHOD AND APPARATUS FOR TREATING STORMWATER RUNOFF

This application claims the benefit of U.S. Provisional Application No. 60/129,542 filed Apr. 16, 1999.

BACKGROUND OF THE INVENTION

1. Field of the Invention

The present invention is a system, method, and apparatus to improve the quality of stormwater runoff or sanitary wastewater effluent by removing pollutants, and, more particularly to a system whereby contaminated water is passed through a one or two-stage complex high flow rate mixed media treatment system. The first stage treatment uses mulch, soil particles, microbes and live plants to treat contaminated water where it flows by gravity to the second stage where pollutants are further removed by sedimentation and anaerobic microbiological processes. Under certain conditions, only the first stage treatment may be effectively utilized.

2. Background Information

Land development results in an increased stormwater runoff. The increased runoff can be as much as 5 to 10 times higher compared to pre-development conditions. This increased runoff can carry with it a variety of pollutants generated from diffuse sources. The pollutants can include sediment from construction sites and stream erosion, heavy metals, oil and grease, toxic organic and inorganic chemicals, nutrients and organic materials depending on the land use. One objective of current stormwater management programs is to remove these pollutants from the runoff prior to it being discharged to surface waters or percolating into the ground water. There are a variety of so-called "best management practices" (BMP's) which are used to remove pollutants. Some of these include retention and detention ponds, wetlands, forested buffers, sedimentation basins, infiltration trenches, grass swales, and various types of filters using peat, sand, soil and leaf mulch and aggregates.

The enactment of the 1972 Clean Water Act (CWA) (and subsequent amendments) recognized the adverse environmental impacts of point and nonpoint pollution on the physical, chemical and biological integrity of our receiving waters. Since enactment of the CWA and the subsequent implementation of National Pollutant Discharge Elimination Systems (NPDES) permit program industries, states and local governments have been in the process of developing strategies and technologies to reduce both point and nonpoint pollution problems. Nonpoint source pollution is the term used to describe the diffuse and non-discrete sources and character of the pollution that can contaminate stormwater runoff. As stormwater runoff flows across the surface of developed land, it can become contaminated with and transport such pollutants as sediment, nitrogen, phosphorus, bacteria, heavy metals, insecticides, pesticides, herbicides, trash, debris, organic material and petroleum products. There is no one source of this nonpoint pollution. Instead this pollution comes from many sources associated with changes in land use, human activities and air pollution deposition. Point source pollution emanates from discrete easily identifiable discharges such as a pipe discharging effluent from wastewater treatment plant, factory or septic system.

High levels of point or nonpoint pollutants in surface waters will result in the degradation of the water quality to receiving surface waters (streams, rivers, lakes and reservoirs), contamination of ground water supplies as pollutant laden waters percolate in the ground and destruction of the aquatic biota (plants, fisheries and invertebrates) sensitive to poor water quality. Contaminated runoff can have a deleterious effect on the human health by degrading the quality of drinking water supplies.

Since the early 1980's regulations have been in place requiring new development to reduce problems associated with nonpoint pollution and stormwater runoff. Numerous BMP's have been developed to treat stormwater to capture, remove or transform pollutants thus reducing their levels in the discharge to surface waters.

The character and levels of the major constituents polluting stormwater runoff are well known and have been studied for many years. The first program to characterize pollutants and their levels in runoff was performed by the United States Environmental Protection Agency (EPA) in a multi year Nationwide Urban Runoff Program (NURP) which began in 1979. They studied 28 separate urban areas across the nation. For example, in the Washington, D.C. metropolitan area the EPA studied urban runoff over a four-year period from 1979 to 1983, and the results were published in 1983 (PO-003208-01). Table 1 summarizes some of the pollutant level contamination findings of the Washington, D.C. area study. The concentrations shown are the averages of all samples examined during the study period.

TABLE 1

| Constituent | Average Concentration | Comments |
|---|---|---|
| Sediment | 80 ppm | Max levels up to 500–600 ppm affects water clarity |
| Total Phosphorus | 03. ppm | Stimulates algae growth |
| Total Nitrogen | 2.1 ppm | Stimulates algae growth |
| Chemical Oxygen Demand | 40 ppm | Indicator of high organic content |
| Bacteria | 200 to 240,000 MPN/l | Indicator of possible pathogens in water |
| Zinc | 60 ppb | Toxic to aquatic organisms |
| Copper | 5 ppb | Toxic to aquatic organisms |
| Nickel | 30 ppb | Product of fossil fuel |
| Lead | 15 ppb | Toxic to aquatic organisms |
| Pesticides | <0.1 ppb | Garden pest Control |
| Phenols | <10 ppb | Leaches from stains |
| Assorted Organic Compounds | <10 ppb | |

Notes: ppm = parts per million or milligrams per liter (mg/l)
ppb = parts per billion or micrograms per liter (ug/l)

The study concluded that the pollutant levels in urban runoff represent a significant threat to the integrity of receiving waters. The high sediment loads cause excess turbidity blocking light to submerged aquatic plants. High phosphorus and nitrogen levels (nutrients for plant growth) cause excessive algae growth, which depletes the water of oxygen suffocating fish and other organisms. Bacteria levels were above public health criteria for recreational activities.

The benefit of filtering contaminated water (stormwater or wastewater) through or bringing it into contact with such constituents as soils, sand, silts, clays, organic material, microbes and plants to treat and remove pollutants from stormwater runoff and wastewater is well known. A variety of complex multimedia filters have been used in the past to remove contaminates from drinking water, wastewater and stormwater runoff. These would include grass swales, stormwater management ponds, wetlands, land spray irrigation treatment systems for wastewater, naturally vegetative buffers, sand filters and bioretention systems.

Constructed ponds incorporating shallow wetlands systems are an example of a BMP that uses a variety of physical, chemical and biological processes to treat stormwater runoff. Runoff flows through the stormwater pond where sedimentation occurs removing particles from the water column and associated pollutant such as organic materials and heavy metals attached to the particles. Runoff is exposed to the pond soils where pollutants are capture by adsorption onto organic and inorganic constituents of the soil. Biological processes occur in the water column by bacteria, algae and plants that assimilate, transform and uptake pollutants and nutrients as part of their metabolic processes. Ponds require long detention times to remove suspended particulate matter due to the time it takes for very small particles to settle out of the water column. Varying intensities of rainstorm events can cause high flow rates through the ponds reducing the time for treatment and poor designs that shorten retention times cause the pollutant removal rate of ponds to be highly variable. High storm flows can cause re-suspension of particles thus flushing out captured pollutants. Under high flow and poor design conditions, ponds have been shown to export some pollutants associated with the re-suspended soil particles.

For BMP's such as ponds, swales and forested buffers, plants play an important role in the removal of various pollutants as they can assimilate into their tissues and incorporate into their bio-mass many of the pollutants or by-products of the break down of the pollutants accomplished by microbial decay. The pollutants would include nitrogen, phosphorous, complex hydrocarbons (oils and grease), carbon dioxide and heavy metals. The soil particles and organic material in these BMP's act to trap and capture pollutants and nutrients and as a media for microbiological reactions to degrade or transform organic and chemical components into substances that plants can then absorb into their tissues.

A 1990 study conducted by the EPA "Performance Evaluation at a long-term Food Processing Land Treatment Site PB90-195389" at a Paris, Tex. wastewater treatment plant showed that polluted effluent from a non hazardous treatment plant could be effectively treated by allowing the water to flow across and into the soils of a meadow with the pollutants being removed by the soil and plant material. This type of land treatment can operate effectively for many years. In this study, the treatment plant was in continuous operation over a 24-year period. In this system, the soils consisted of clays, sand, and clay loams with organic carbon levels ranging from 0.27% to 1.72%. The plants used were reed canary grass and tall fescue. The pH values of the soil ranged from 4.65 to 7.16. Table 2 shows the concentration of some of the constituents in raw wastewater that was discharged to the land treatment filtering system.

TABLE 2

| Constituent | Average Concentration |
| --- | --- |
| Total Suspend Solids | 15,140 ppm |
| Total Phosphorus | 7.6 ppm |
| Total Nitrogen | 17.4 ppm |
| Biological Oxygen Demand | 616 ppm |
| Zinc | 0.17 ppm |

Notes: ppm = parts per million or milligrams per liter (mg/l)
ppb = parts per billion or micrograms per liter (ug/l)

Comparing the constituent levels in the wastewater from the 1990 EPA study to the urban runoff levels in the 1983 EPA NURP study, it is apparent that the wastewater pollutant loads were many times higher than the urban runoff levels. The 1983 EPA study on the land treatment systems showed that the pollutant removal rates for BOD (biological oxygen demand), COD (chemical oxygen demand), TOC (total organic carbon) and TSS (total suspend solids) were consistently high with mean removal rates of 92%. Total nitrogen removal rates were between 84% and 89%. This study demonstrated the effectiveness of plantsmicrobes/soil in removing pollutants from a source of contaminated water.

The 1990 EPA study also showed that even with the treatment areas being exposed to rain fall during the year, the system was capable of handling both the wastewater flows and the rain water runoff without affecting the performance of the systems. This highly stable system functioned effectively over a 24-year study period and maintained high pollutant removal rates of ammonia between 60 to 99 percent, TSS 87 to 95 percent and BOD 90 to 99 percent. The rate of application of sewage effluent on the meadow was quite low and using this type of system for stormwater runoff would require the use of vast areas of land to treat runoff.

Sand filters have been used for many years for treatment of runoff, water and wastewater. The Austin Tex. sand filter was one of the first used for stormwater runoff purposes. The performance of sand filters shows a high degree of variation in their pollutant removal efficiencies and it is highly susceptible to clogging. Sand filters generally have a high maintenance burden and the surface of the sand filter must be continually cleaned. Generally, sand filters do not remove nitrogen, and usually generate nitrogen in the form of nitrates though the nitrification of organic matter trapped in the sand media.

Of particular interest, in regard to the present invention, is the prior art BMP known as bioretention or sometimes commonly referred to as a "rain garden". This practice was first analyzed and described in the "Bioretention Feasibility Analysis", Prince George's County Government, May 1992. A bioretention design manual described the recommended criteria for the construction and maintenance of the BMP entitled the "Design Manual for the Use of Bioretention in Stormwater Management", Prince George's County Government, June 1993. Bioretention is described as an experimental method to treat stormwater runoff by filtering runoff through the soil and facultative plants (plants that can tolerate wet and dry conditions) to remove pollutants. The 1993 design manual provides some guidance on many aspects of the concept such as its use and purpose, locating bioretention facilities, minimum sizing guidelines, preferred plant materials, plant maintenance guidelines, soil guidelines, mulch criteria, ecological considerations, infiltration/flow rates, flow control, pollutant removal mechanisms and other design guidelines. Prince George's County Government developed the bioretention practice to allow for greater use and treatment of stormwater runoff within the green space or landscaped areas of residential, industrial and commercial properties. Bioretention maximizes the use of green space for storage and treatment of stormwater runoff. Runoff can be diverted to a bioretention BMP located in the landscape where runoff is ponded at shallow depths (6 inches or less) passing through the mulch, soil and plant complex thus removing pollutants and allowing the treated runoff to infiltrate into the ground. This design is essentially an enhanced infiltration BMP where the filtered water is allowed to infiltrate into the ground. The bioretention system is designed to occupy about 5% to 7% of a site area to control the first ½ inch of runoff.

The 1993 bioretention design guidelines describe the BMP as having a shallow ponding area 6 inches deep or less, a variety of facultative plants both woody and herbaceous, a mulch layer of 2 to 3 inches, a 4 foot deep layer top soil and 1 foot of sand. The facility is excavated and filled with the materials previously mentioned. The facility is de-watered by water percolating into the surrounding ground or through evapotranspiration. The use of bioretention as described in the 1993 guideline is limited to soils with high infiltration rates and good drainage.

For the bioretention system to function properly, aerobic conditions must be maintained. Bioretention systems require good drainage and the free flow of oxygen into the soil for the health of soil microbes and plant material. The plants in the system are upland plants as opposed to wetland plants. If soils are allowed to stay wet or soggy for very long periods, anaerobic (without oxygen) conditions will develop. Under these conditions the plants and microbes will be deprived of oxygen which will limit growth, functions or cause the plants to die. As long as aerobic (with oxygen) conditions persist, the soil and microbe complex react with pollutants and nutrients making them available for plant uptake. Bioretention BMP's were designed to make use of upland plants to remove pollutants where the soil mulch and plants act together as a system to hold, transform and metabolize the pollutants.

Pollutants are removed from stormwater runoff in the bioretention BMP by many physical, chemical and biological processes as the contaminated runoff moves through the mulch, soil, microbes and plant filter system. Suspended soils are removed throughout the process of sedimentation as runoff is allowed to pond at shallow levels above the filter media. Suspended soils are removed by filtration as the runoff passes through the soil complex. Removal of organic compounds that cause a biological oxygen demand (BOD) is accomplished by microbial degradation, filtration and sedimentation, nitrogen is removed through nitrification and plant uptake, phosphorous is removed through adsorption, sedimentation and precipitation. Heavy metals are removed through sedimentation, precipitation, adsorption and plant uptake.

Since the introduction of the bioretention in 1993, the success of the BMP has been mixed. Prince George's County released the 1993 design guideline and described the BMP as only experimental, encouraging others to improve upon the design. The limited success of the original bioretention design is in part due to the lack of specific design standards, construction guidelines and maintenance details provided in the 1993 guidelines. This lack of specificity in the 1993 design manual was due to the fact that bioretention was a new and experimental practice. The County did not know precisely how to optimize the hydraulic and pollutant removal functions of the bioretention BMP. The lack of specificity in the 1993 design manual required inexperienced designers to rely on their limited knowledge and expertise concerning the BMP to maximize the effectiveness of the design to ensure success. Variations in the soil mix, infiltration rates, plant materials and design applications allowed for uncertain and varying results in the performance of the bioretention BMP.

Recognizing the limitations of the 1993 design and in an attempt to improve the reliability of the bioretention BMP in June of 1998, Prince George's County completed the study "Optimization of Bioretention Design for Water Quality and Hydrologic Characteristics" to investigate bioretention pollutant removal capabilities and mechanisms. In June of 1998, Prince George's County, based on the study findings and several years of experience, issued a general design guideline update for bioretention. These 1998 design guidelines recommended a number of modifications to the 1993 design guidelines. Although these recommendations represent an improvement in the design, they still lack specificity in the application and design and rely on the designer's own limited knowledge and experience, or lack of it, to design this still experimental practice. These current design guidelines still lack specificity in many design aspects allowing for a high degree of variation in the performance of the bioretention BMP.

A severe limitation was placed on the bioretention system in the 1993 design guideline requiring reliance on the infiltration capabilities of the in-situ soils in which the facility was constructed and used to de-water the system. To ensure some degree of success the device could only be used where infiltration rates where higher than 0.5 inches per hour. Furthermore the design allowed great variation in the amount of clay allowable in the soil media, of up to 25%. Experience showed that this high of rate of clay content slowed the infiltration of water through the systems to such a rate as to create anaerobic conditions killing the plants. When the designer chose a soil mix with high clay content and in-situ soils with a low permeability or infiltration, anaerobic conditions resulted killing the plants. The 1998 guideline update reduces the clay content to a maximum of 10% which is also very high. Since this is only a guideline, there is nothing to prevent the designer from using material with higher clay content. High clay content even at 10% will cause the soil to retain too much water and affect the performance of the plants and microbes in the facility.

Another limitation of the current design guideline is the slow and prolonged filtration rates of the water passing through the bioretention BMP. The recommended minimum infiltration rate of the soil is 0.5 inches/hr. with the facility draining within 3–4 days. This long drying out period severely limits the types of plants. It also means the system would not dry out and be ready to receive water from the next storm if the event occurred at an interval more frequent than 4 days. Furthermore, the long retention times require designing very large facilities to treat larger runoff volumes for a more frequent storm interval. The design guidelines combined with poor designs, inconsistency in the soil used, poor in-situ soil infiltration rates, improper application and use of the facility, and excessive ponding times have resulted in continued significant failures of the BMP.

Furthermore the 1998 bioretention study results showed that the bioretention design resulted in the inability of the system to remove nitrates and actually increased the amount of nitrates in the filtered water. This is in part due to the breakdown of organic nitrogen to nitrates (nitrification). Under the aerobic conditions of the bioretention filter the nitrates cannot be converted to nitrogen gas (denitrification). The study showed that nitrate levels could actually increase above the levels of the incoming contaminated water. High levels of nitrates in ground water can be a serious public health threat. Nitrates cause "blue babies syndrome" or methemoglobinemia, which prevents oxygen from getting to the blood.

One design of a bioretention facility is to excavate a hole into the existing soils and back fill with the prepared soil mix. In cases where the facility is located adjacent to the roadways, sidewalks and buildings the disturbance of the soil around these structures, settling of the soils within the bioretention area and the flow or seepage of water into the ground around these structures can affect the structural integrity of adjacent structures. Sinkholes could develop as soil particles are carried away by ground water seepage and piping. Slope failure at the edges of the bioretention area could occur as the soils settle and lose the ability to support adjacent soils. This design contains no structural container and allows for piping or erosion of soils from around adjacent structures, buildings, roadways and sidewalks destabilizing their integrity.

The above-described bioretention design purpose is to treat the first flush (sometime defined as the first ½ to 1 inch of runoff). In some studies, the first flush of runoff from a site has been shown to contain higher concentrations of pollutants. This is true for some pollutants and in some situations but not all pollutants nor is it true for all situations or areas of the United States. For example, oil grease and sediment may flow off the surface at concentrations that are dependent on the duration, intensity and velocity of the storm event and have no relationship to the first flush volume. Systems designed for first flush treatment may not be capable of treating flows for long duration events or pollutants that continuously flow from the land over the entire storm event.

Stewart U.S. Pat. No. 5,322,629 discloses a chamber for treating stormwater runoff. The filter media in Stewart comprises a mature deciduous leaf compost and this filter media is drained using a drain field system. Stewart composts the filter media so as to prevent release of nitrogen and phosphorous. In the present invention, which is capable of treating domestic wastewater, industrial wastewater, as well as stormwater runoff, the source of organic matter within the soil mixture may include a wide range of non-composted materials such as wood mulch, yard wastes, shredded paper or cardboard. In addition, the present invention uses live plants growing within the filter media to treat the water and remove water from the media. There are other differences which will be apparent.

BRIEF SUMMARY OF THE INVENTION

It is an objective of this invention to standardize the performance and improve upon the design of the basic bioretention BMP, to take it out of the realm of experimental devices and develop a reliable, dependable, more effective, low maintenance and structurally sound device easy to construct and maintain. The embodiments of this invention standardize the soil media, place the facility in a concrete container, increase the ability to remove nitrogen with the addition of an anaerobic denitrification chamber and system capable of treating large volumes of runoff over a greater period of time. The objective of this invention is to improve and advance the art of bioretention by improving its reliability, pollutant removal capability, eliminate the problems of danger to the structural integrity of surrounding structures, increase its capacity to treat greater volumes of runoff and to increase the type, variety, aesthetics and habitat value of plants which can be used in the facility. This invention can be used for a variety of contaminated waters including urban stormwater runoff, agricultural runoff and domestic agricultural, industrial and commercial wastewater.

Of particular interest to this invention is the use of filter devices to treat and remove pollutants from stormwater runoff. Filters use organic materials, inorganic materials and living organisms individually or in variety of combinations to provide a media for a wide range of physical, chemical and biological mechanisms to remove, capture and transform pollutants.

The invention preferably embodies a two-stage biologically active filtering and treatment system to remove pollutants from contaminated water prior to being discharged to the surface, drainage systems or into/onto the ground. The first stage is a mulch, soil, microbe and plant complex filter that removes pollutants using a variety of physical, chemical and biological mechanisms under predominantly aerobic conditions. It has been demonstrated that when contaminated water such as stormwater runoff or wastewater is brought into contact with or filtered/percolated through a soil/plant complex, that pollutants and nutrients are removed. One aspect of this invention is to provide for a uniform and standardized soil mixture to optimize the flow rate and pollutant removal. The mulch, soil and plant filter complex is contained in an engineered structure of specific dimensions and geometry to provide for adequate flow and pollutant removal. Water enters the first chamber percolating through the filter media by gravity and the plant roots and soil media remove pollutants. The water is then collected in a horizontal collector under drain pipe at the bottom of the chamber. The treated water then flows through the horizontal pipe to a vertical pipe where it is once again filtered by shredded mulch contained in the vertical pipe and suspended in the vertical pipe by a wire screen retaining device. This mulch material filters the water and allows it to pass to the second water-filled chamber where pollutants are further removed by physical and microbiological processes under anaerobic conditions. Another aspect of this invention is that the second anaerobic chamber treatment chamber is designed with a specific dimension and geometry to achieve the desired level of removal of pollutants. Under anaerobic conditions nitrate is converted to nitrogen gas, a process known as denitrification. The second chamber or vault is designed with a series of baffles to maximize the water flow and retention time for treatment through a second chamber. After the water passes through the second chamber, it is then discharged to the surface, drainage systems or into/onto the ground.

As an alternative embodiment, the first chamber may be utilized without the second chamber in a manner to be described.

DETAILED DESCRIPTION OF THE PREFERRED EMBODIMENTS

Figure 1:
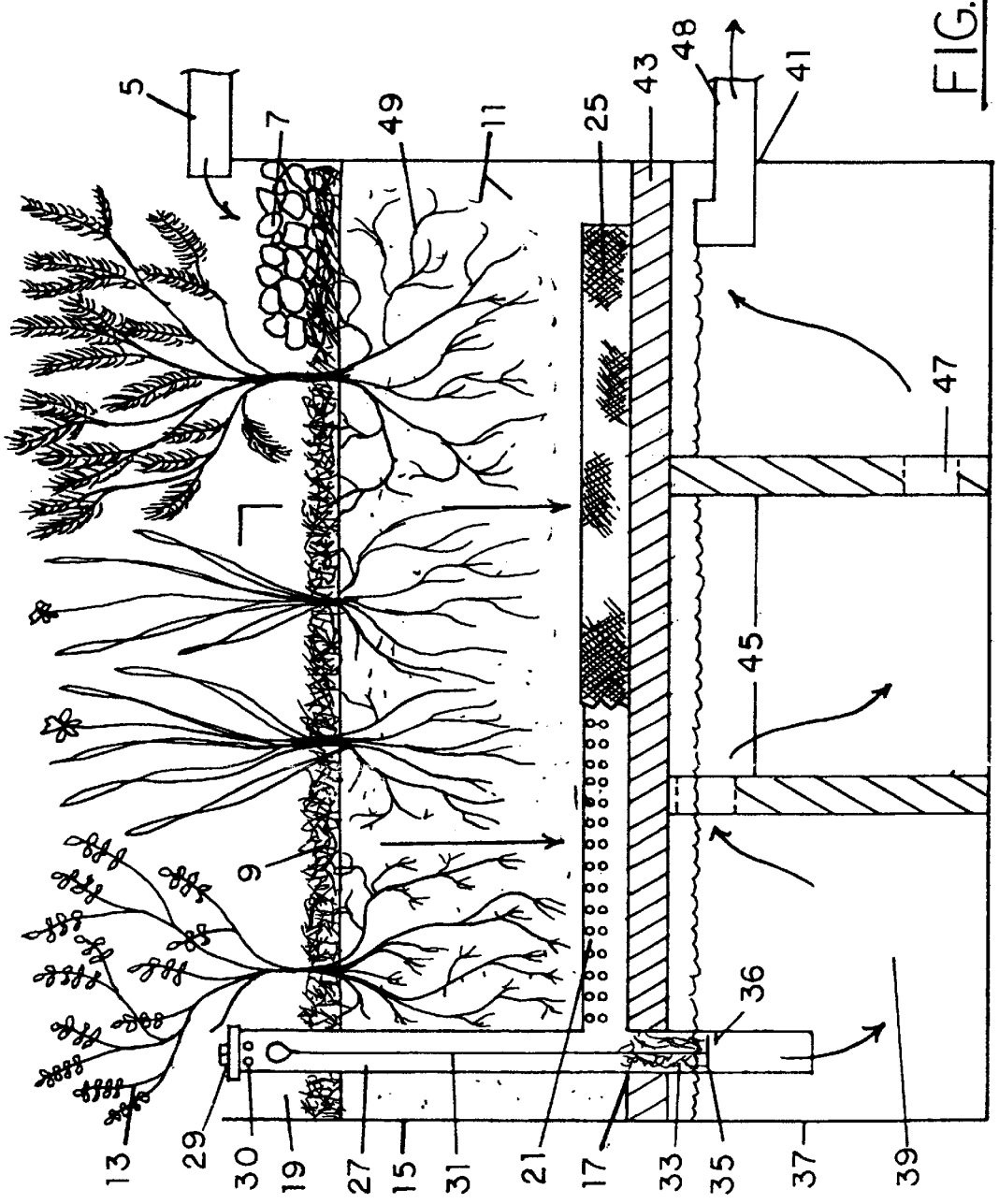
FIG. 1 is a cross-sectional view of an embodiment showing the first aerobic chamber and second anaerobic treatment chamber.

The present invention removes pollutants from contaminated stormwater runoff or wastewater by passing it through a two-chamber aerobic/anaerobic biologically active soil, microbe and plant filter treatment system. The first chamber filters or treats contaminated water through a layer of mulch, a soil mixture and plants under aerobic conditions. Treated water from the first chamber then flows to the second chamber where it is treated in a water-filled chamber under anaerobic conditions. The effluent from the two-chamber system is then discharged to a drainage system, the surface or the ground. The two chambers are generally constructed at such an elevation that stormwater runoff or wastewater will drain through the two chambers by gravity. This description includes the physical structures of the two chamber filter apparatus and pollutant removal functions of the embodiment's various components and prefer-red applications associated with the invention.

Contaminated water enters the first soil/microbe plant-filled chamber through an inlet structure, curb cut or pipe opening 5 and is directed onto a flow velocity reducing device consisting of rocks or rip-rap 7 or a device which will disperse and reduce the velocity (generally less than 2 f/s) of the incoming water to prevent erosion of the mulch layer and soil filter media. The water then flows onto and ponds upon the surface of the filter media consisting of mulch 9, an organic/sandy/aggregate soil mixture 11 and plants 13 contained in the first chamber 15.

The preferred embodiment of the first chamber is a water tight concrete (or other impermeable material) container (rectangular, square or circular in shape) which is open at the top and enclosed on all sides and the bottom with one or more outlet openings 17 in the bottom to allow water to flow out by gravity from the first chamber into the second chamber. The dimensions and shape of the first chamber will vary according to unique site conditions and constraints, type of application and the desired quantity and flow rate of water to be treated and the water quality improvement desired. One example is a concrete manhole type of structure with a diameter of approximately 7–8 ft. and a height of approximately 2–3 ft. Basically the chamber should be relatively shallow in relation to its lateral dimension, e.g. its diameter. That is, the depth to surface area ratio is relatively low, e.g. 1 to 10, 20, 30 or 40, which may vary depending on the particular application. This size chamber, with a similarly sized second chamber, could treat an area of approximately one-half acre of impervious surface, such as a parking lot with a flow rate through the filter media of approximately one-half to one and one-half cubic feet/second. The watertight nature of the first chamber prevents the exchange, seepage or flow of water from this chamber to the surrounding soils or the mixing of contaminated water with ground water. The concrete chamber will prevent movement and settlement of the soils surrounding the chamber helping to ensure the structural integrity of adjacent structures such as roadways, curbs, sidewalks and parking lots.

Above the filter media in the first chamber is an open storage area 19 several inches deep for which one purpose is to provide space for the deposition of sediment, trash and debris. Another purpose of the storage area is to allow water levels to rise to elevations which will create a hydraulic gradient or pressure to force water through the soil filter media. The ponded and slow-moving water on the surface of the filter mulch/soil media allows sedimentation and collection of the heavier particles on the surface of the mulch and filter media. Floatable trash and debris also settles and collects on the surface of the mulch or becomes entangled on the leaves and stems of the plants growing in the filter media. The entrapment of the trash and debris on the surface of the filter media and on the plants makes this material easily accessible for removal and prevents such material from entering receiving waters.

Contained in the first chamber are the components of the filter media; mulch, a soil mixture and plants. One preferred embodiment of the filter media is a 3-inch layer of aged and/or fresh hardwood shredded mulch 9, and an underlying 1.5 to 2.5 foot deep soil mixture 11. In this embodiment, the soil mixture is composed of approximately 70% (by volume) coarse sand and/or aggregate. The aggregate may comprise gravel, rocks, metal, plastic or other materials that would enable the appropriate flow characteristics, pollutant removal, root support and microbial growth with a size range of about 1 mm to 2.5 mm in diameter. The sand/aggregate component acts to create pores for water flow and as a matrix to hold the organic component of the soil mixture in place. As used herein, the term "matrix material" means the sand and/or aggregate. The remaining approximately 30% (by volume) of the soil mixture is a high grade agricultural type sandy loam top soil (containing sand, silts, clay, organic matter and live organisms). This first embodiment, with the approximately 70/30 matrix material/soil mixture ratio provides for a relatively low flow rate of approximately 0.026 (cubic foot/second)/square foot of filter surface area with a resultant high pollutant removal due to the longer contact time that the contaminated water has with the filter media within the container. Thus, with a 7 foot diameter container having a surface area of approximately 38.4 square feet, the flow rate would be approximately 1 cubic foot per second. It is preferred that the flow rates range between 0.5 and 1.5 cubic foot/second.

The ratio between the matrix material and the sandy loam top soil (containing organic material) may vary depending upon the particular applications. For example, the sandy loam top soil component of the soil mixture could be as much as approximately 50% with the remaining 50% being the matrix material (i.e. the sand and/or aggregate). The flow rates would decrease with increased volume of sandy loam top soil. Generally, it is not expected that the sand loam top soil component would be less than approximately 30% or around ⅓ by volume of the soil mixture.

In a second preferred embodiment, the container includes the same mulch layer 9 but the soil mixture is composed of approximately 70% (by volume) of coarse sand and/or aggregate ("matrix material"). In this embodiment the aggregate may be of similar material to that described above but having a size range slightly larger, i.e. preferably in the range of 2 mm to 5 mm in diameter. This increased size in the matrix material will result in higher flow rates. In this second embodiment the remaining approximately 30% (by volume) is composed of an organic material (95%) with a small amount (5%) of high grade agricultural type sandy loam topsoil (containing sand, silts, clay, organic matter and live organisms) of the same type as discussed in the first embodiment. The use of a larger aggregate and the reduction in the amount of sandy loam topsoil, along with the inclusion of organic material in place of the sandy loam top soil will result in higher flow rates from that of the first embodiment. This higher flow rate will reduce the contact time between the contaminated water and the soil mixture generally resulting in reduced pollutant removal capabilities but allowing greater volumes of water to be treated over a shorter period of time. The organic material that is part of the soil mixture 11 can be derived from many sources including shredded bark or hardwood mulch, wood mulch, yard waste (sticks, leaves, grass clippings, etc.) even newspapers, cardboard and other recycled woody or paper materials.

As with the first embodiment, the ratio between the matrix material (sand and/or aggregate) and the primarily organic material (with a small amount of sandy loam top soil) may vary and may approximate a 50—50 split. Adjusting the composition of the soil mixture, as well as the size of the chamber, may allow for a wide range of design flow rates but within the preferred range of 0.5 and 1.5 cubic feet/second.

The soil mixture of both of the two embodiments described above contains pores of a size to allow for either slow or rapid flow of water through the soil mixture, free transfer of gasses with the atmosphere, space for water and air to be retained and space for soil organisms to be retained and grow. Modification of the composition of the soil mixture and the chamber size will allow for a wide range of design flow rates preferably between 0.5 cfs (cubic foot/second) to 1.5 cfs. That is, the design flow rates may range between approximately 0.013 cubic foot/second per sq. ft. of filter surface area and 0.039 cubic foot/second per sq. ft. of filter surface area, where the filter device concrete structure is cylindrical having a 7 ft. diameter (the filter surface area being 38.4 square feet).

The various soil mixtures in the above described embodiments having a range of ratios between the amount of organic material, soil and sand/aggregate are alterable in order to accommodate the wide range of polluted water sources (i.e. stormwater runoff or wastewater from residential industrial or commercial sources), varying rainfall intensities, different stormwater treatment regulatory requirements, different pollutant sources and flow discharges and may also be adjusted so as to target certain specific pollutants such as heavy metals or oil/grease. Where higher or lower flow rates are desired or needed to accommodate a particular treatment objective, source of polluted water, volume of water or type of pollutant to be treated, the soil mixture and specifically the ratio between the matrix material and the remaining material that includes organic material as described in the above preferred embodiments, can be altered. In addition, the overall surface area or size of the filter can be changed. The size of the aggregate used within the matrix material can also be adjusted to vary the flow rate. For example, to increase the flow through the filter to treat a greater volume of runoff from a parking lot, one could do one or more of the following: (1) increase the size of the sand/aggregate; (2) increase the overall surface area of the container; (3) decrease the depth of the filter media or (4) reduce the amount of organic material in the soil mixture. To increase the pollutant removal capabilities of the filter, one could do one or more of the following: (1) increase the level of mulch in the mulch layer 9; (2) increase the amount of organic material within the soil mixture; (3) increase the amount of top soil within the soil mixture; (4) decrease the size of the sand/aggregate; (5) decrease the cross-sectional area of the container and correspondingly increase the filter media depth.

The preferred embodiment of the mulch layer 9 is commercially available aged shredded hard wood mulch. Although aged wood chips can be use they have a tendency to float and become dislodged when in ponded water allowing the underlying soil to become exposed. Shredded mulch has less tendency to float and the shredded structures of the mulch particles adhere to one another forming a more cohesive mat of mulch over the soil.

The preferred embodiment of the sandy loam top soil that is included within the soil mixture 11 embodiments is shown in Table 3. Those skilled in the art understand sandy loam soil to be that consistent with soil described in the United State Department of Agriculture's (USDA) basic textural classes. Generally, the USDA describes soil by percent particle size groups as three classes clay, silt and sand. Sandy loam soils may have a range of particle sizes but on the average consist of 15% clay, 25% silt and 60% sand and includes organic material. The percent clay of the sandy loam soil should be less than the average of 15%. Too much clay in the system will have a tendency to slow the infiltration rate of the system. The infiltration rates of a good sandy loam soil suitable for this embodiment would be over 2 inches/hour.

TABLE 3

Sandy loam topsoil major constituents by weight.

| Constituent | Percent by weight |
| --- | --- |
| Silicon Dioxide | 90.23 |
| Organic Material | 5.06 |
| Aluminum Oxide | 1.13 |
| Iron Oxide | 0.85 |
| Calcium Oxide | 0.27 |
| Magnesium Oxide | 0.20 |
| Potash | 0.13 |
| Phosphate | 0.02 |
| Live Organisms | 0.05 |
| Sodium Oxide | 0.23 |
| Titanium Oxide | 0.68 |
| Sulfur Trioxide | 0.03 |
| Manganese | 0.12 |
| Nitrogen | 0.07 |
| Trace Metals (Zn, Cu, Mb, B, Co) | 0.03 |

The sandy loam topsoil should preferably be of a class A grade fertile agricultural type soil suitable for good plant growth and containing the full complement of soil macro and micro fauna and flora (not shown). The definition of soil fertility is the soil's ability to make nutrients available to plants and to allow for their capture and uptake by the plants. The greater the soil's ability to perform these functions, the more fertile the soil is considered to be.

The plant material 13 that grows within the first chamber can be of any facultative wet or dry variety (i.e., can tolerate fairly wet to fairly dry conditions) and should be of a shrub or herbaceous variety with a shallow root system or structure that can be accommodated in and grow well in the depth and volume of the soil media in the first chamber. For the preferred embodiments, trees or very large woody shrubs would not generally be appropriate unless additional soil depth was added to accommodate the large root system. Obligate wetland plants (i.e., those that must always have very wet soils) are not preferred in this embodiment. The preferred embodiment of mulch, soil mixture and plants is intended to mimic that of a well-drained terrestrial or meadow soil plant ecosystem and conditions, not a wetland soil plant ecosystem system. The types of plants to be used are not only selected based on their pollutant removal characteristics but also such factors as the suitability to climatic conditions, depth of filter needed, tolerance of or affinity to pollutants, desired or preferred aesthetic values, desired habitat benefits and desirability of native or non-native plants. Generally, the plants used are selected in view of the unique site characteristics on a case by case basis.

In the first chamber, pollutants are removed by physical, chemical and biological mechanisms as contaminated water passes through the mulch/soil/microbe/plant filter media. Located at the bottom of the upper chamber is one or more horizontally perforated drainpipe(s) 21. The preferred embodiment is that the drainpipe(s) extend across the length of the bottom of the first chamber to allow for even drainage of soil filter media. The diameter of the pipe is selected to be sufficient to achieve the desired flow rate and made of an inert plastic material such as PVC. The perforations in the pipes are preferably of ¼ inch to ⅜ inch in diameter.

Figure 4:
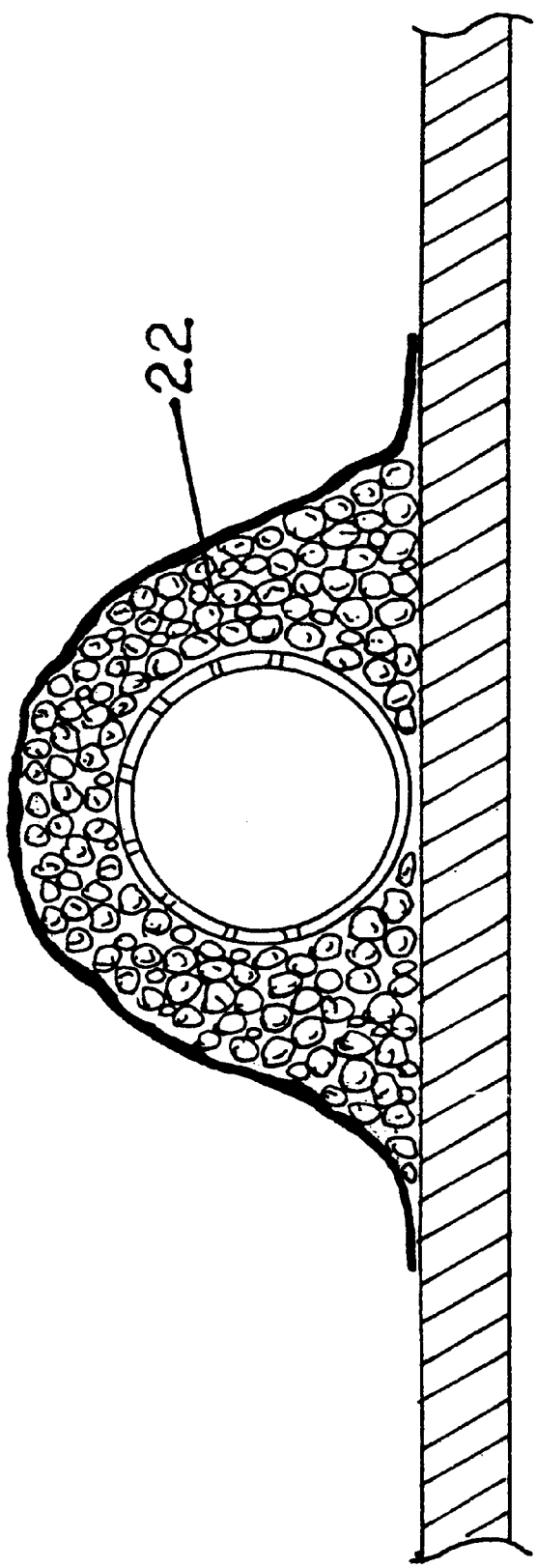
FIG. 4 is a cross-sectional view of an alternative underdrain pipe using gravel.

The drainpipe(s) 21 is preferably surrounded or wrapped by a layer of geotexile fabric or wire screen 25 in direct contact with the pipe maintaining a separation between soil filter media and the pipe. An alternative embodiment of the drain pipe construction would be to use a layer of gravel 22 between the pipe and the fabric as shown in FIG. 4. There are a number of acceptable commercially available filter fabrics on the market suitable for this application. The preferred embodiment would be non-woven material with high flow capacity or a wire screen made of fiberglass or aluminum with a minimum pore opening of approximately 1 mm or of sufficient size to prevent the filter media from freely passing through the screen. The purpose of the filter fabric or wire screen is to allow water to freely pass from the filter media into the drainpipe(s) while creating a barrier to prevent particles from being washed away by the water flowing into the drainpipe(s). Filtered and treated water is collected in the horizontal drainpipe(s) where it flows by gravity into the vertical pipe 27 through the opening in the bottom of the first chamber into the second chamber. If multiple horizontal drainpipes are used, a manifold into the vertical pipe may be necessary. Alternatively, multiple vertical pipes could be used.

In this preferred embodiment the vertical pipe extends several inches above the mulch layer though the soil media through the bottom of the first chamber extending several inches into the second chamber. The vertical pipe collects the filtered water from the upper chamber by way of the horizontal drainpipe(s).

The vertical pipe also allows access to the second chamber and can be used as a clean out port to remove sediments that may collect in the second chamber over time. The sediments can be removed by a vacuum pump similar to that used to clean out sediments from septic tanks. The vertical pipe may have a cap on the top 29 and lock (not shown) to restrict easy access to the vertical pipe opening. The top of the vertical pipe is also used to control the depth of water ponding over the top of the mulch. Allowing water to enter the vertical pipe near the top through several openings 30 controls the water elevation. The vertical pipe also allows access to the horizontal drainpipe(s) that can be cleaned by flushing sediments out of a pipe using a stream of pressurized water.

Preferably, the vertical pipe houses a removable filter strainer device that holds shredded mulch 33 and a wire screen 35 with a long handle 31. This apparatus is used to filter the water as it flows from first chamber into the second chamber through the horizontal drainpipe into the vertical pipe. This wire screen and handle apparatus or retaining device holds several inches of shredded mulch in place within the vertical pipe at an elevation below the invert of the horizontal drainpipes. The retaining device is held in place and prevented from falling into the second chamber by a plastic or metal pin 36 which protrudes into the vertical pipe. Water flowing from the horizontal drainpipe passes through the layer of mulch and is filtered again before entering the second chamber. The retaining device consists of a non-corrosive handle that extends to near the top opening of the vertical pipe and a non-corrosive (stainless steel or plastic) retainer screen upon which several inches of shredded mulch rests. The mulch also provides a source of organic matter that as it decomposes becomes a source of organic carbon and energy needed by the denitrification bacteria to convert nitrates to nitrogen gas in the second chamber.

The preferred embodiment of the second treatment chamber 37 is a completely enclosed water tight chamber filled with water 39 to within a few inches of the top of the chamber with one or more inlet openings and one or more outlet openings 41. The preferred embodiment of the second chamber is a concrete vault (rectangular, square or circular in shape) whose top enclosure 43 is formed by the bottom of the top chamber (that is, the top chamber is stacked on top of the bottom chamber) and is enclosed on all sides and bottom. Water flows by gravity into the second chamber from the upper chamber through the vertical pipe containing the retaining wire screen and mulch filter. The preferred embodiment of the second chamber contains two or more baffles 45 that prevent short-circuiting of the flows through the second chamber. The baffles ensure that the water flowing from the second chamber is thoroughly mixed with the water residing in the second chamber and creates longer flow paths and retention time of the water in the chamber to improve treatment and removal of pollutants through physical, chemical and biological processes. This is achieved by placing openings 47 in the baffles to force the flow of water to the bottom and top of the second chamber. The baffles also provide structural support for the bottom of the top chamber. The dimension and geometry of the chamber will vary according to the unique site conditions and constraints, desired quantity of water to be treated, the level of pollutant removal desired and the size and geometry of the first chamber whose bottom forms the top of the second chamber. The watertight nature of the second chamber prevents the exchange, seepage or flow of water from this chamber to the surround soils or the mixing of water in the chamber with the ground water. This will prevent movement and settlement of the in situ soils surrounding the chamber helping to ensure the integrity of adjacent structures roadways, curbs and parking lots.

The second chamber is designed to treat the water from the first chamber under anaerobic conditions to allow for additional removal of nitrates through microbiological assimilation and denitrification or conversion of nitrates to nitrogen gas.

Treated water for the lower chamber is discharged to the surface or receiving drainage systems through one or more outlet pipes 48. The outlet pipe is located near the top of the second chamber and is designed to accept water from the second chamber through an opening at the top of the pipe. The location and configuration of the outlet pipe maintains the water level in the second chamber and allows gasses from the microbial decomposition of organic matter and nitrates in the water column to escape into the atmosphere.

The preferred approximately 3-inch layer of mulch 9 covering the surface of the soil mixture 11 in the first chamber performs a variety of finctions. The mulch layer serves the same function as in any garden or landscape; it helps to keep the upper layer of soil moist helping to protect the plants and soil from drying out. Retained moisture in the soil ensures the proper soil structure and environment for the soil bacteria and invertebrates, worms, msects and roots to function. The mulch layer provides a source of organic matter for the soil mixture necessary for healthy plant growth and a source of carbon for microbiological actions. Organic material is carried into the soil by leaching and by soil organism worms and other invertebrates. As important as the mulch's function to maintain a healthy environment for the plants and soil biota, it plays an important role as a treatment media for the removal of heavy metals from the contaminate water. Organic matter has a high affinity for the adsorption of the charged ions of heavy metals (Cu, Al, Zn, Fe, Pb, Cd, Ni, Cr, Mn and Co). This is commonly referred to as organic compelling. Organic matter contains humic and fulvic acids that are polyelectrolytes with high molecular weights. Within their chemical structures they contain carboxyl, phenolic, hydroxyl and methoxy functional groups that can form bonds with the ionic forms of heavy metals.

The affinity of the metal ions toward the organic humic polyelectrolytes is dependant on pH and the particular variety metal ion. The organic mulch layer also has an affinity to attract other organic substances such as oil, grease gasoline, pesticides though weak covalent electrostatic attractive forces or absorption.

Soil biology or the ecological relationship between the soil, plants, the soil fauna (earth worms, nematodes, arthropods, microbes such as protozoa, bacteria, algae and fungi) is an important aspect of this embodiment. This invention is intended to optimize the symbiotic and dynamic relationships between the inorganic soil constituents, soil biota and the plants complete with all of the physical, chemical and biological pollutant removal, cycling and transformation mechanisms found in a natural meadow or a terrestrial soil/plant complex.

Microbes consume the mulch and plant residues converting it into new cells, releasing some as carbon dioxide and water, and transforming the remainder into soil organic matter. The biochemical activities of soil bacteria are critical in cycling and removing pollutants in soil. Biological pollutant removal activities performed by soil organisms include ammonification, nitrification, denitrification, mineralization, immobilization, decomposition of noimitrogenous compounds, conversion of inorganic substances into cellular constituents and microbial degradation. These processes hold and transform pollutants and nutrients making them available for uptake by the plants or further chemical reactions by soil particles.

The life functions and activities of the living invertebrate organisms found in the soil (worms and insects and their larva) are important in maintaining the soil structure, hydraulic percolation functions and pollutant removal. Burrowing organisms create tunnels and pores in the soil that allow water to move through and be stored in the soil. Burrowing organisms leave excrement aggregates which transfers and cycles organic matter from the surface mulch layer to the soil helping to maintain a healthy balance of organic material in the soil for plant and bacteria growth. Worms consume soils and bacteria helping to serialize the soil and transform it into aggregates that add structure to the soil. The bacteria consume hydrocarbons including oil, grease and gasoline converting it to carbon dioxide and water and cellular material. This microbial decomposition process is used and taken advantage of in the bioremediation of soils to remove petroleum based pollution.

The plants 13 growing in the soil of the first chamber are important to the proper function of this invention. The plants are capable of uptaking heavy metals, nitrogen and phosphorus. The roots 49 provide a media or habitat for microbiological activity necessary to maintain the symbiotic relations with the plants to allow them to fix and assimilate nitrogen and for the process of bioremediation and phytoremediation of pollutants captured in the soil to take place.

The plants 13 not only conduct phytoremediation (translocate chemicals from the soil to the plant tissue), the stems and leaves act to trap or snag floatable debris and hold it in place for easy removal thus preventing it from entering the waterways. The roots as they grow keep the soil open providing pathways for the water to enter the soil. When the roots die off they add organic matter to the soil increasing its ability to support microbiological growth and remove pollutants.

Evapotranspiration by the plants is an important mechanism in the de-watering of the soil media between storm events and application of contaminated water. In the hot summer months evapotranspiration rates can exceed rainfall amounts. The plants can also regulate the amount of water removed from the soil and are capable of either slowing down the loss of soil water during dry conditions or accelerating the loss of water during wet conditions. This is accomplished by opening and closing of the small openings called stomata on the underside of the leaves, wilting of leaves or the loss of leaves. The plants in effect help to regulate the proper soil moisture conditions necessary for healthy growth of the plants and soil organisms thus maintaining the necessary conditions to optimize the pollutant removal mechanism of the system.

The soil 11 and its structure serve several roles. It is a media to support the microbiological growth necessary for plant growth, the source of nutrients for plant growth and the physical support or anchor for the plants to prevent wind throw. The size and shape of the soil particles play a role in creating pores in the soil that allow for the transport of water and pollutants/nutrients and the holding of water. The soil particles can have a thin layer of water surrounding them that allow soil bacteria to grow on the particle surface and in the void spaces between the particles. The voids contain air and allow it to pass though the soil to supply oxygen to the plants and soil organisms.

The soil's solid material containing clay, silts and organic material has a very large surface area to allow for a wide range of pollutant removal reactions to occur between the interfaces of the soil particle water and bacteria. The soil complex is an extremely versatile chemical reaction vessel where the clay, silts and organic material particles can retain high concentrations of ions, absorb materials, and allow for cation exchange and precipitation of pollutants. Air and porosity of the soil determines the flow rate characteristics. Increasing the porosity will increase the flow rate and volume of water that can percolate though the soil.

Heavy metals can also be retained in the soil though the process of adsorption. The surface of soil particles can be negatively or positively charged. Ionic forms of heavy metals are attracted to the charged surface of the soil particles. The affiiity (cationic exchange) of this reaction to occur depends on the characteristics of the soil and soil pH and the variety of metal ions. Other chemical reactions that can occur in the soil include precipitation of metals, creation of metal oxides and complexing with the organic material in the soil.

The bottom chamber is designed to encourage denitrification. When anaerobic conditions exist and in the presence of organic matter as an energy source and nitrate, denitrifiing bacteria will convert the nitrates to gases, nitrogen $N_2$ or nitrous oxide $NO_2$. In this embodiment, the organic matter comes from the dissolved organic material leaching out of the filter and the mulch in the vertical tube as it decomposes. As the water flows through the second chamber bacteria in the water column convert the nitrates to nitrogen gas.

The preferred embodiments of this invention envision a design flow rate between 0.5 and 1.5 cubic foot per second (cfs) for a container of 6–8 ft. diameter. This invention is designed for a high flow rate in order to reduce the space needed for a treatment device and to treat as much of the annual volume of runoff as is feasible. The preferred embodiments also envision the use of the embodiment as before-the-pipe treatment device. The best application of this device is to locate many small filter systems throughout the developed site in a uniform, disbursed and decentralized manner. This device filters and treats runoff prior to its entering a pipe system, or discharged to the surface or in the ground.

There are a number of advantages to the strategy of using a high flow rate. One is that the space needed for the device is quite small. As an example, using the previous stormwater pond example needing a 1.4 acre surface area to control first ½ inch volume of runoff, the present invention (with a 1cfs flow rate filter) only requires 9.50 ft$^2$ size filter devices covering a total surface area of 450 square feet or 0.0103 acres to treat the sane volume of runoff. This invention would only require about 7% of the space needed for a stormwater pond to treat the same volume of water.

The capacity of this embodiment to treat specified volumes of contaminated water is dependant upon the filtration characteristics of the soil which is designed to achieve a flow rate of between 0.5 and 1.5 cfs and the size of the filter chambers. To achieve control of greater volumes of water requires a larger filter surface or the use of additional filters to achieve a greater surface area. For example, to increase the treatment capacity of this embodiment to control the volume of runoff from ½ inch of runoff to one inch of runoff would require doubling the surface area of the embodiment. With this embodiment it is envisioned that several devices would be installed when used to control stormwater runoff for each development site. With several facilities there is little likelihood of a total failure, that is, all of the filter devices out of service at one time. If one device should fail or need to be taken out of service for maintenance other devices would still be in operation. This is not the case with conventional stormwater management strategies that rely on one centralized facility; if it should fail, the whole system fails and is out of operation.

With the smaller size of this embodiment the scale and cost of maintenance are reduced also. With this embodiment maintenance consists of replacing the mulch on a periodic, e.g. an annual basis, proper care and replacement of the plants and periodic removal of sediment deposits.

With this mulch/soil/plant filter system embodiment placed throughout a developed site, pollutants are captured near their source. If a pollutant spill should occur, the pollutants would be captured and safely contained in the watertight chambers of this embodiment and easily removed thus preventing contamination of the surrounding ground and receiving waters.

Because of its small size and shallow depth, it will be a useful tool to retrofit existing development. The device can be constructed adjacent to existing storm drain inlets to intercept, capture and treat runoff prior to discharge into the storm drain system. It can be placed in landscaped islands and green spaces in parking lots or streetscapes.

Although the present embodiments have the capacity to store sedinents in the space provided above the mulch and in the voids in the filter media, nevertheless to extend the life of the facility for sediment removal, one can pre-treat the runoff in a manner to remove sediment before it enters the filter device or to use the device in applications where low sediment loads are expected.

Figure 2:
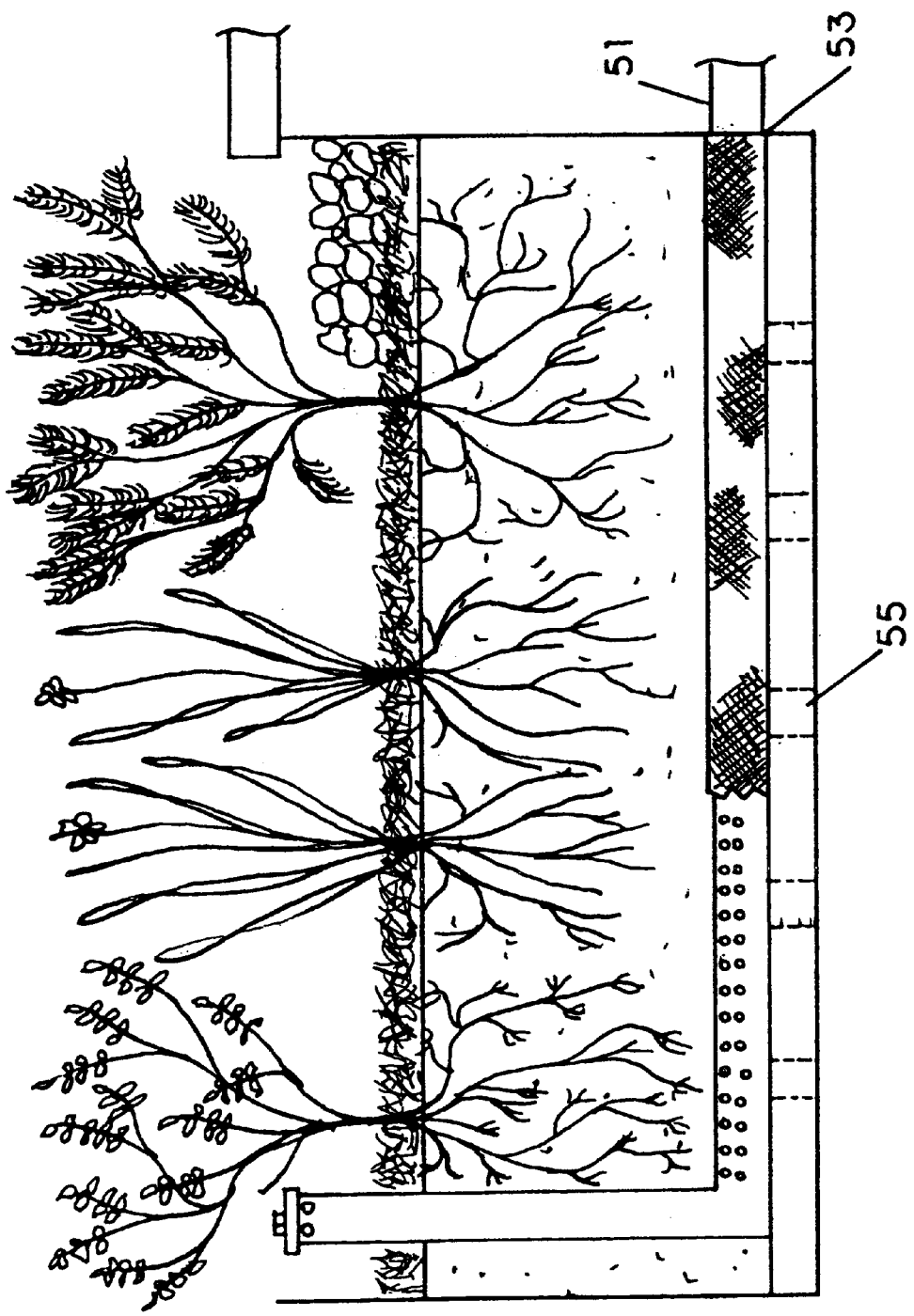
FIG. 2 is a cross-sectional view of an embodiment with only the aerobic first chamber.

Another embodiment of this filter system is to only use the first chamber without the second chamber to filter and treat contaminated water. This embodiment is shown in FIG. 2. This would be desirable where the removal of nitrates is not necessary or where the levels of nitrogen of the contaminated water are quite low or where space is limited. This embodiment is constructed using the same mulch/soil/plant filter media, inlet controls, vertical and horizontal drainpipe (s). The modifications for this embodiment would include the following. The vertical pipe need not extend through the bottom of the chamber; it is connected to the horizontal drainpipe(s). The horizontal drainpipe(s) 51 extend through the wall 53 of the chamber and discharges treated water to the drainage system.

Where recharge of the treated water is desirable and where the in situ soils are very sandy and have infiltration rates greater than 1 inch/hour and the ground water is below the bottom of the chamber, holes 55 may be placed in the bottom of the chamber to allow water to percolate into the ground. The soil in the filter chamber must be well drained in order to maintain aerobic conditions necessary to maintain the appropriate moisture conditions for the fertility of the soil media and health of plants. The use of chamber holes 55 can be in conjunction with the use of the horizontal drainpipes or, alternatively, the horizontal and vertical drainpipes can be eliminated in their entirety. Similarly, the holes may be placed in the side wall near the bottom. Still further, one or more relatively large diameter holes in the side wall can communicate with drain pipes extending radially.

Figure 3:
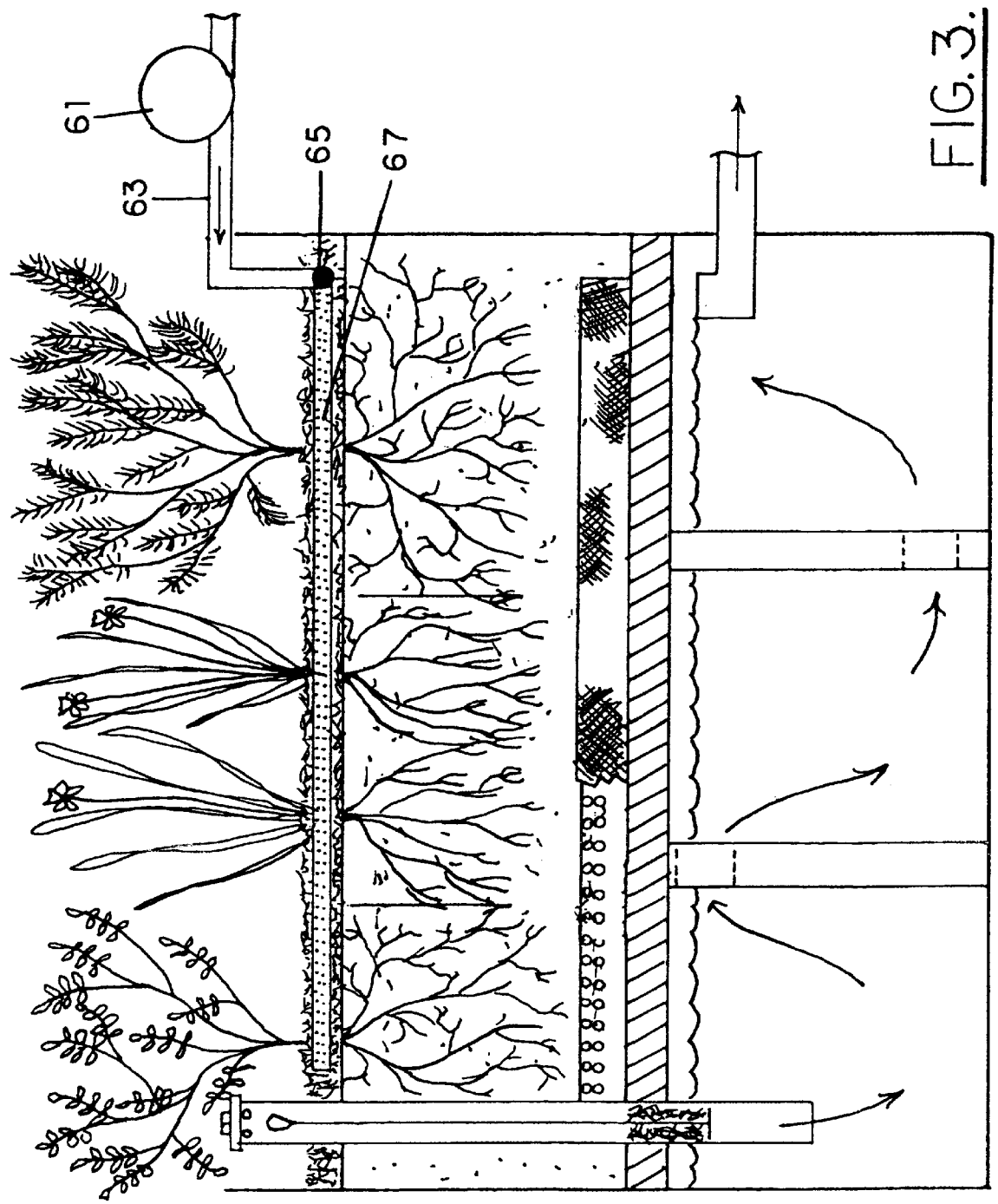
FIG. 3 is a cross-sectional view of the two-chamber embodiment with a pump and drip irrigation system.

Another embodiment (shown in FIG. 3) of this filter system is the use of the two chamber configuration in the treatment of sewage effluent from onsite residential septic systems or other commercial/industrial wastewater sources. The use of this embodiment for treatment of individual onsite septic wastes is particularly useful where the septic system drain fields have failed and retrofit systems are needed as an interim solution to treat the effluent from a septic tank. The same two-chamber aerobic and anaerobic chamber configuration can be used with modifications to the mechanism of delivering the contaminated water to the first chamber as shown in FIG. 3. The septic tank effluent would be delivered to the first filter chamber by a pump 61 from the septic tank (not shown) through a pipe 63 into a manifold 65 system where the water would be distributed to several ½ inch diameter or larger perforated drip irrigation plastic tubing 67. This method of delivering the septic tank effluent allows for even distribution of the wastewater to the soil media. The wastewater is then treated using the same physical, chemical and biological process described previously.

Figure 5:
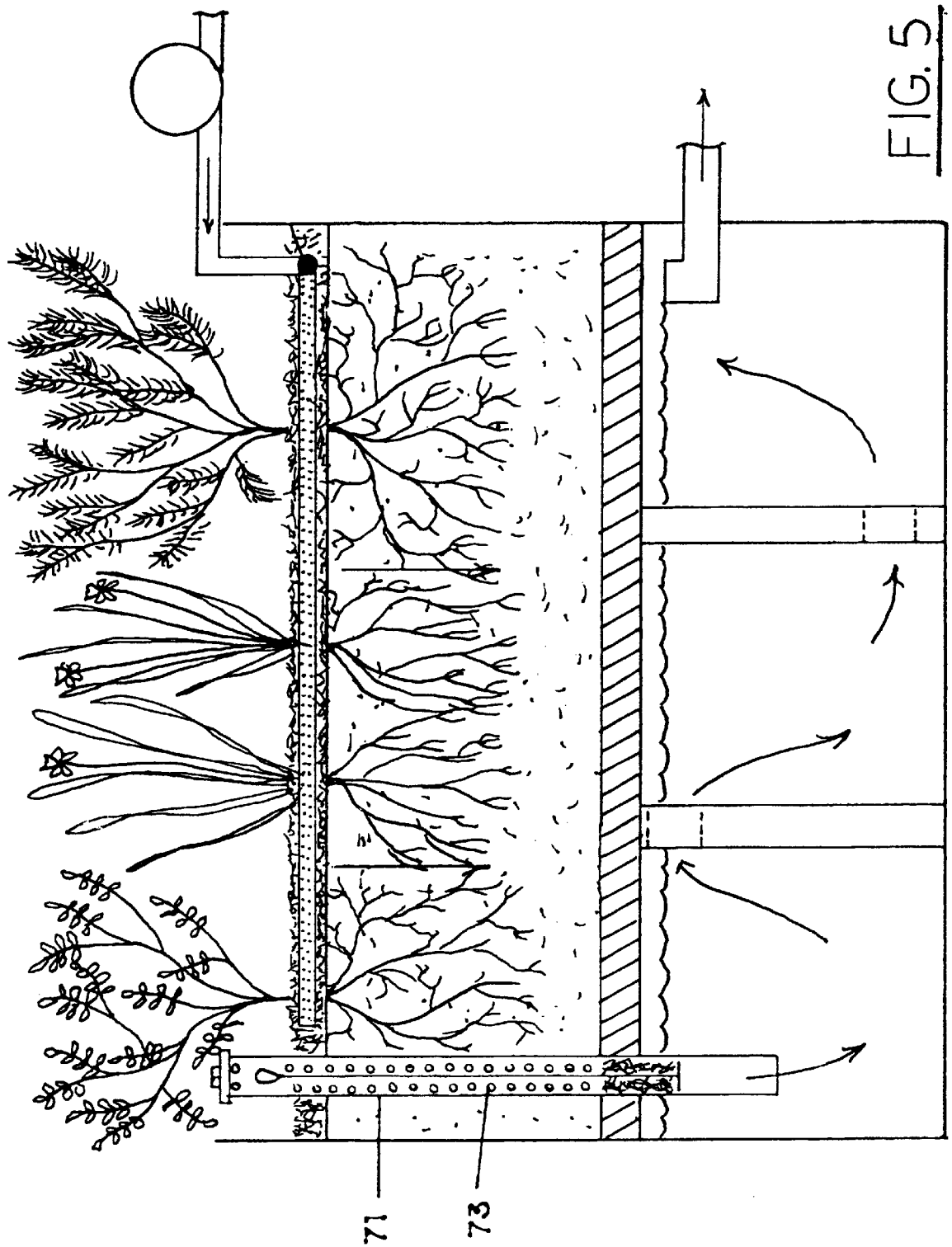
FIG. 5 is a cross-sectional view of an alternative embodiment using a vertical drainage system.

Another embodiment shown in FIG. 5 uses a vertical drainpipe 71. The vertical pipe is perforate 73 to allow water to flow by gravity into the vertical pipe to the second chamber. FIG. 5 shows this embodiment with a pump system to deliver the contaminated water to the first chamber but, the embodiment could also be used with an inlet pipe to deliver the contaminated water to the filter system as shown in FIG. 1.

Figure 6:
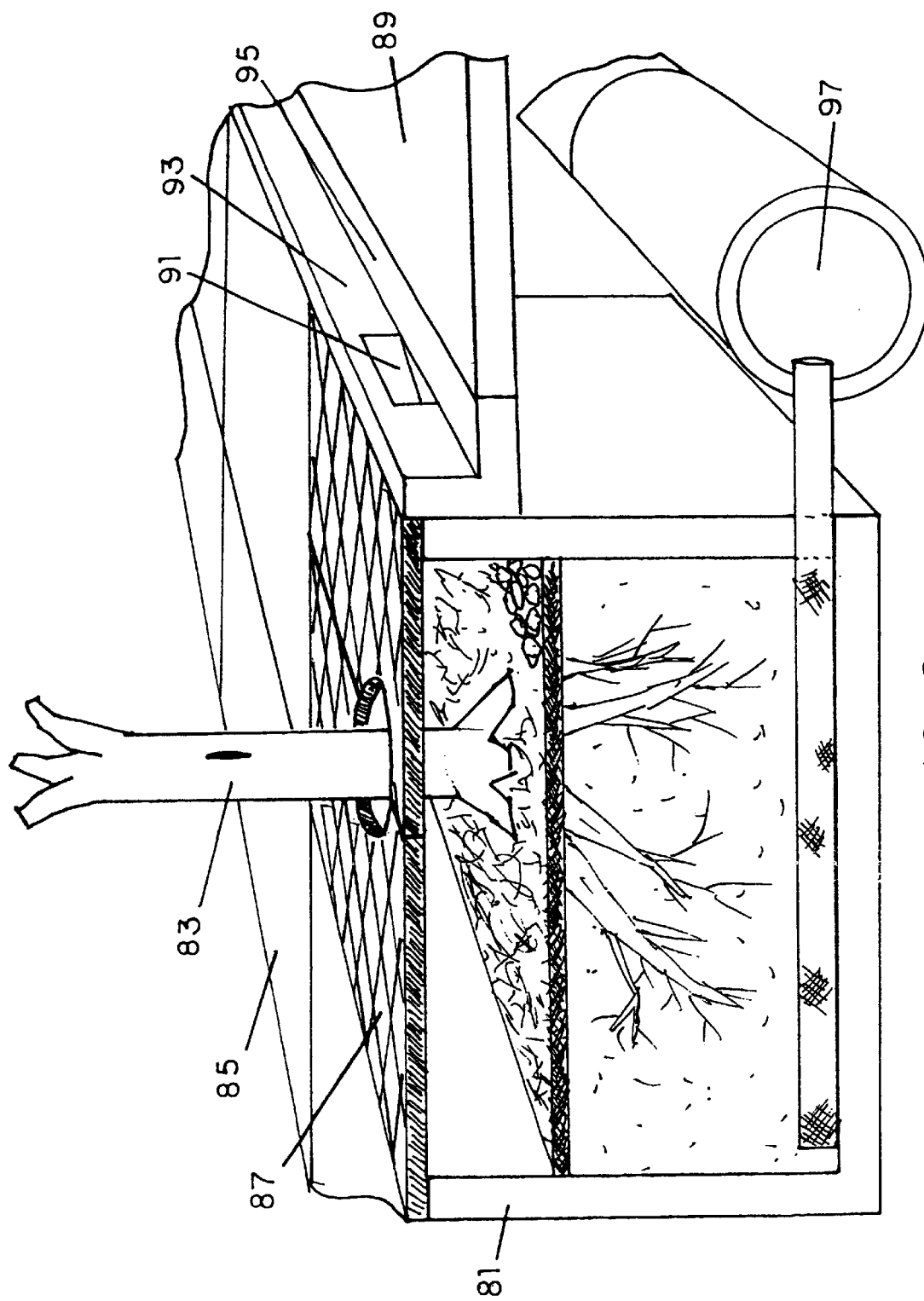
FIG. 6 is a perspective view of an application of the use of the filter system in conjunction with streetscapes to treat road stormwater runoff.

Another embodiment shown in FIG. 6 shows an application of the treatment system where the filter is designed and incorporated into a streetscape tree box treatment system. This system would allow streetscape trees, shrubs and vegetation to be used to treat road and sidewalk runoff in urban areas. The tree box filter system would be constructed in a concrete container 81 of appropriate size to accommodate design flows and the tree 83 and its root system. Runoff from the sidewalk 85 would enter the system through a grate opening 87 at the top of the concrete box. Roadway 89 runoff would enter and be delivered to the filter system through a pipe or slot 91 in the face of the curb 93 at the gutter 95 line. The trees, shrubs or vegetation are planted at an elevation low enough to create a storage volume above the top of the mulch soil filter media sufficient to achieve the desired level of treatment. The soil would be drained by one or more drain pipe (s) located at the bottom of the concrete container connected to and allowing water to flow into a storm drain 97, other drainage system or the receiving waters.

One skilled in the art may envision additional embodiments and may contemplate using different mixtures of soils with different proportions of mulch, aggregate, plants, sand, clay, silt, organic material and other soil amendments to enhance the pollutant removal capabilities of the soil. One may envision that the configuration of the first aerobic and second anaerobic chambers could be altered from a vertical arrangement to where they are staggered in different vertical and horizontal parallel planes connected by piping. The chambers could be made of other materials such as plastic or fiber glass. One of the unique features of the filter is its flexibility and adaptability to be used in a wide range of filtration applications and pollutant removal uses. To properly apply the filter device in a wide range of applications, the physical configuration of the container, the underdrain system, the inlet and outlet structures may need to be modified. To meet specific pollutant removal objectives, aesthetic or habitat benefits, the filter media constituents and their ratios as well as the types of plants may have to be modified from the preferred embodiments described herein.

The foregoing is considered as illustrative only of the principles of the invention. Further, since numerous modifications and changes will readily occur to those skilled in the art, it is not desired to limit the invention to the exact construction and operation shown and described and, accordingly, all suitable modifications and equivalents may be resorted to falling within the scope of the invention as defined by the claims.

What is claimed is:

1. A contaminated water treatment apparatus for treating contaminated water such as stormwater and wastewater, the apparatus comprising a substantially water impermeable treatment chamber having an open top, a sidewall, and defining a bottom surface, said chamber positionable below ground level with the open top extending above ground level in communication with the atmosphere and for receiving the contaminated water to be treated, said treatment chamber including a filter media comprising a layer of mulch overlying a soil mixture that includes (a) a non-organic matrix material comprising at least one of sand and aggregate and (b) a material that includes organic matter, wherein said non-organic matrix material is substantially 50% to 70% (by volume) of the soil mixture and said material that includes organic matter is the remaining portion of the soil mixture, the apparatus further comprising live plant material growing in the filter media.

2. The apparatus of claim 1 wherein said non-organic matrix material is substantially 70% (by volume) of the soil mixture.

3. The apparatus of claim 1 wherein said material that includes organic matter is top soil that includes organic matter.

4. The apparatus of claim 3 wherein said top soil is a high grade agricultural-type sandy loam top soil.

5. The apparatus of claim 1 wherein said material that includes organic matter is comprised primarily entirely of organic material.

6. The apparatus of claim 5 wherein the organic material is approximately 95% (by volume) of organic material with the remainder being top soil.

7. The apparatus of claim 6 wherein the organic material is approximately 95% (by volume) of organic material with the remainder being top soil.

8. The apparatus of claim 1 wherein said treatment chamber includes at least one opening in a bottom portion of the chamber through which the treated water passes.

9. The apparatus of claim 8 wherein said bottom surface of the chamber is a water impermeable bottom surface with a plurality of openings therethrough.

10. The apparatus of claim 8 further comprising a perforated pipe within said chamber in commnunication with said at least one opening.

11. The apparatus of claim 10 wherein said perforated pipe is positioned substantially horizontally adjacent the bottom of said chamber, the bottom of said chamber being a water impermeable bottom surface, said opening in a sidewall adjacent said bottom surface.

12. The apparatus of claim 11 further comprising a vertical pipe extending from the open top to the substantially horizontally positioned perforated pipe.

13. The apparatus of claim 1 wherein said organic material is primarily mulch.

14. The apparatus of claim 1 wherein said treatment chamaber defines a contaminated water ponding area between said open top and said mulch layer.

15. The apparatus of claim 1 wherein said live plant material includes non-wetland soil plant material.

16. The apparatus of claim 1 wherein said water treatment chamber is a shallow chamber having a depth substantially less than the side-to-side dimension of the open top.

17. The apparatus of claim 16 wherein said water treatment chamber is a cylindrically-shaped concrete structure.

18. The apparatus of claim 1 wherein the ratio between said water treatment chamber cross-sectional area and its depth is approximately 10–40 to 1.

19. A system for treating contaminated water such as stormwater and wastewater comprising a plurality of water treatment apparatuses as claimed in claim 1 positioned at various locations in the ground in a field area to be treated.

20. A two-stage water treatment system for treating contaminated water such as stormwater and wastewater, each stage comprising a substantially water impermeable treatment chamber with one stage positionable above the other stage, each of said two stages positionable below ground such that the bottommost treatment chamber is an anaerobic treatment chamber and the upper treatment chamber is an aerobic treatment chamber, the upper treatment chamber having sidewalls that extend above ground level with an open top in communication with the atmosphere and for receiving the contaminated water to be treated, wherein the upper treatment chamber includes a bottom wall defming an opening to communicate with the lower treatment chamber, said upper treatment chamber including a filter media therein comiprising a soil mixture that includes a non-organic matrix material and a material that includes organic matter wherein water treated by the upper chamber passes into the lower chamber for treatment within the lower chamber, said lower chamber further comprising an opening to enable the treated water to flow out ofthe lower treatment chamber after treatment.

21. The two-stage treatment system of claim 20 wherein said aerobic upper treatment chamber includes a layer of mulch overlying said soil mixture.

22. The two-stage treatment system of claim 21 further comprising live plant material growing in the filter media.

23. The two-stage treatment system of claim 20 wherein said lower treatment chamber is substantially filled with water.

24. The two-stage treatment system of claim 23 wherein the lower treatment chamber includes a plurality of baffles to divide the lower treatment chamber into separate areas, each baffle including an opening to enable water to be treated to pass through the separate areas so as to lengthen the treatment time of the contaminated water within the lower treatment chamber.

25. The two-stage treatment system of claim 20 wherein the upper treatment chamber includes a substantially horizontal pipe adjacent the bottom thereof, said pipe including a plurality of openings to receive water treated in the upper chamber, said horizontal pipe communicating with a vertical pipe extending into the lower chamber, wherein said water treated in the upper chamber passes into the horizontal pipe and downward through the vertical pipe into the lower chamber.

26. The two-stage treatment system of claim 25 wherein said vertical pipe includes a vertical pipe extension extending upward through the upper chamber and ending adjacent the top of the upper chamber.

27. A contaminated water treatment apparatus for treating contaminated water such as stormwater and wastewater, the apparatus comprising a substantially water impermeable treatment chamber having an open top, a sidewall, and defining a bottom surface, said chamber positionable below ground level with the open top extending above ground level in communication with the atmosphere and for receiving the contaminated water to be treated, said treatment chamber including a filter media comprising a layer of mulch overlying a soil mixture that includes (a) a non-organic matrix material comprising at least one of sand and aggregate and (b) a material that includes organic matter, further comprising live plant material growing in the filter media, and wherein the ratio between the water treatment chamber cross-sectional area and its depth is approximately 10–40 to 1.

28. The apparatus of claim 27 wherein said non-organic matrix material is substantially 50% to 70% (by volume) of the soil mixture.

* * * * *